United States Patent [19]

Strand et al.

[11] Patent Number: 5,688,899
[45] Date of Patent: Nov. 18, 1997

[54] CLARITY COPOLYESTER

[75] Inventors: Marc Alan Strand; Bobby Jones Sublett; Jimmy Ray Trotter, all of Kingsport, Tenn.

[73] Assignee: Eastman Chemical Company, Kingsport, Tenn.

[21] Appl. No.: 786,592

[22] Filed: Jan. 21, 1997

[51] Int. Cl.$^6$ .................................................. C08G 00/00
[52] U.S. Cl. ........................ 528/279; 528/275; 528/279; 528/280; 528/285; 528/286; 528/289; 528/290; 528/292; 528/293; 528/295; 528/298; 528/300; 528/301; 528/308; 528/308.6
[58] Field of Search ............................ 528/275, 279, 528/280, 285, 286, 289, 290, 292, 293, 295, 298, 300, 301, 308, 308.6

[56] References Cited

U.S. PATENT DOCUMENTS 5,372,864  12/1994  Weaver et al. ................. 428/36.92
5,384,377   1/1995  Weaver et al. ................. 525/437

*Primary Examiner*—Samuel A. Acquah
*Attorney, Agent, or Firm*—Cheryl J. Tubach; Harry J. Gwinnell

[57] ABSTRACT

An improved clarity copolyester of a diethylene glycol modified poly(ethylene terephthalate) has a b* value of less than 15, preferably less than 10. The copolyester composition has an inherent viscosity of about 0.4 to 1.0 dL/g and comprises (A) 100 mol percent dicarboxylic acid residue component, (B) 100 mol percent diol residue component, (C) catalyst residues and (D) color control agent residues. The dicarboxylic acid residue component comprises at least 75 mol percent of terephthalic acid residues. The diol residue component comprises 10 to 50 mol percent diethylene glycol residue and 50 to 90 mol percent ethylene glycol residue. The catalyst residues comprise 20 to 100 ppm manganese, 50 to 300 ppm antimony, 0 to 100 ppm titanium and 40 to 150 ppm phosphorus, based on the weight of the copolyester. The color control agent residues comprise organic or inorganic toners present in a sufficient amount to reduce the b* color value of the combination of components A, B, and C to less than 15 by the addition of component D. Preferably, the color control agent residues comprises either (i) 40 to 100 ppm cobalt, (ii) 1.5 to 10 ppm of blue compounds of substituted 1,4-bis(2,6-dialylanilino) anthraquinones and 0.5 to 6 ppm of red compounds of anthraquinones and (iii) 0.5 to 10 ppm of 1-cyano-3H-dibenz[f,ij] isoquinoline-2,7-diones, all ppm based on the weight of the copolyester.

10 Claims, No Drawings

CLARITY COPOLYESTER

TECHNICAL FIELD OF THE INVENTION

This invention relates to diethylene glycol modified poly (ethylene terephthalates) and, more particularly, to improved clarity compositions of such copolyesters and processes for their preparation.

BACKGROUND OF THE INVENTION

Poly(ethylene terephthalate), i.e. PET, is commonly modified with other glycol components such as diethylene glycol (DEG) to produce varying properties in the copolyester compositions. In particular, DEG modified PET, which typically has about 10 to 50 mol percent diethylene glycol in the diol residue component, has a low glass transition temperature making it useful as an adhesive or coating layer. Applications include coating paper board or metal such as for metal containers, plastic cards, destructive seals on food packages and the like. DEG modified PET has been used as a tie layer between various polymers and substrates and has been used as an adhesive layer for lidding stock onto polymer and paper board.

DEG modified PET has also been blended with other copolyester such as PETG, which is a 1,4-cyclohexane dimethanol (CHDM) modified PET. These copolyester blends are useful as shrink films to replace polyvinyl chloride. By utilizing the low glass transition temperature of the DEG modified PET, the copolyester blends have a thermal shrinkage behavior close to that of polyvinyl chloride. The amount of DEG modified PET that can be used in the copolyester blends has been limited because of a high level of yellow color in the DEG modified PET. Most shrink film applications require a clear colorless film with a minimal haze rating.

The b* color level (yellowness index) of commercial DEG modified PET known as EASTOBOND Copolyester 13162, available from Eastman Chemical Company of Kingsport, Tenn., has been about 25 resulting in a maximum level of such DEG modified PET for shrink film formulation of approximately 8 to 10 percent. A desire exists to raise this level of DEG modified PET to about 20 percent or higher in order to more closely approximate the properties of polyvinyl chloride and improved performance of the shrink film. In order to accomplish such the b* value for DEG modified PET would need to be about 10 or less. Heretofore, current technology does not exist to produce a DEG modified PET with such low b* values.

U.S. Pat. Nos. 5,372,864 and 5,384,377 to Weaver et al. disclose the use of a particular toner system comprising certain blue 1,4-bis(2,6-dialkylanilino) anthraquinone compounds and red anthraquinone or anthrapyridone compounds to impart a neutral to slightly blue hue to polyesters having a yellow appearance. The preferred polyesters disclosed and utilized in the examples are not DEG modified PET. As detailed below, the use of the toner systems disclosed in these patents for DEG modified PET does not produce a copolyester having a b* color value of about 10 or less.

U.S. Pat. No. 4,745,174 also discloses the use of toners to improve the apparent whiteness of polyesters. These toners, which are derivatives of dibenzoisoquinolinediones, are disclosed as being used with various polyesters. However, the examples do not include DEG modified PET. Accordingly, the improvement of b* values to about 10 or less are not disclosed.

Thus, there exists a need in the art to have a DEG modified PET that has decreased yellowness for use in shrink film applications to closer approximate the properties of polyvinyl chloride, as well as other applications that require material clarity. Accordingly, it is to the provision of such an improved clarity DEG modified PET that the present invention is primarily directed.

SUMMARY OF THE INVENTION

An improved clarity copolyester of a diethylene glycol modified poly(ethylene terephthalate) having a b* value of less than 15 is disclosed. The copolyester composition has an inherent viscosity of about 0.4 to 1.0 dL/g and comprises 100 mol percent dicarboxylic acid residue component, 100 mol percent diol residue component, catalyst residues and color control agent residues. The dicarboxylic acid residue component comprises at least 75 mol percent of terephthalic acid residues. The diol residue component comprises 10 to 50 mol percent diethylene glycol residue and 50 to 90 mol percent ethylene glycol residue. The catalyst residues comprise 20 to 100 ppm manganese, 50 to 300 ppm antimony, 0 to 100 ppm titanium and 40 to 150 ppm phosphorus, based on the weight of the copolyester. The color control agent residues comprise organic or inorganic toners present in a sufficient amount to reduce the b* color value of the combination of components A, B, and C to less than 15 by the addition of component D. Preferably, the color control agent residues comprise either (i) 40 to 100 ppm cobalt, (ii) 1.5 to 10 ppm of blue compounds of substituted 1,4-bis(2,6-dialylanilino) anthraquinones and 0.5 to 6 ppm of red compounds of anthraquinones and (iii) 0.5 to 10 ppm of 1-cyano-3H-dibenz[f,ij] isoquinoline-2,7-diones, all ppm based on the weight of the copolyester.

A process for preparing the improved clarity copolyester is also disclosed which comprises reacting the dicarboxylic acid and the diol residue components at temperatures sufficient to effect esterification or transesterification and polycondensing the reaction product in the presence of the catalyst residues and color control agent residues.

DESCRIPTION OF THE INVENTION

An improved clarity copolyester of a diethylene glycol modified poly(ethylene terephthalate) having reduced yellowness is obtained by the combination of a color control agent and a novel catalyst system. A commercially available DEG modified PET known as EASTOBOND Copolyester 13162, available from Eastman Chemical Company of Kingsport, Tenn., has a b* color value of approximately 25. In comparison, the improved clarity copolyester of the present invention has a b* color value of less than 15, preferably less than 10.

The b* color value is based on the CIELAB color scale using the following parameters: 1) D65 Illuminant, 2) 10 degree observer, 3) specular included and 4) large area view. The b* color value measures yellowness when plus and blueness when minus. The preferred device used to measure b* color value is a HunterLab Ultrascan Colorimeter available from Hunter Associates Laboratory.

The b* color value is affected by sample form (i.e. pellet size and shape). In the present invention conventional polyester pellets of DEG modified PET are placed in a glass sample holder having a thickness of 2 cm with a black background. The color measurement is by reflectance. The pellets are approximately 2–3 mm in diameter, 2–3 mm in length and weigh 0.8 gms/50 pellets.

The use of the color control agent alone is not sufficient to obtain the desired improvement in clarity, i.e. reduction in yellowness, for DEG modified PET. The effectiveness of using blue and red toners as the color control agent to neutralize yellow in polyesters is disclosed in U.S. Pat. Nos. 5,372,864 and 5,384,377. While a reduction in yellowness does occur for DEG modified PET using the blue and red toners of the prior art, this reduction is not sufficient to result in b* color values of less than 15 for the DEG modified PET copolyester having an original b* color value of about 25.

Apparently, the effectiveness of the blue and red toners to neutralize yellow decreases with increasing yellow color in the base polymer. This phenomenon is shown as "delta" in Table I below, the data of which is from treating various polymers of differing degrees of yellow with the same level of blue and red toners.

TABLE I

| b* of base polymer | b* of base polymer w/toner | delta |
|---|---|---|
| 17 | 7 | 10 |
| 19 | 11 | 8 |
| 24 | 19 | 5 |
| 28 | 25 | 3 |

The addition of higher levels of toners to reach a neutral hue was not feasible because the polymer became dark and unacceptable for use in many application.

With the target b* value at 10 or less for use in shrink film application, the base color of the natural material prior to addition of toners needs to be below 19 as indicated from the data in Table I. Thus, commercial DEG modified PET such as EASTOBOND Copolyester 13163 with a b* color value of 25 is not capable of having the desired b* color value without modification to the base material. Efforts to obtain a b* color value of 20 or less in the base material by optimizing catalyst levels were unsuccessful. The catalyst used in producing the commercial DEG modified PET includes 40 to 100 ppm manganese, 20 to 100 ppm titanium, and 20 to 100 ppm phosphorous. Zeolite 4A is also used as a nucleator.

By combining a novel catalyst system of the present invention for DEG modified PET and a color control agent an improved clarity copolyester of DEG modified PET is attained. The improved clarity copolyester has a b* value of less than 15, preferably less than 10. The copolyester composition has an inherent viscosity of about 0.4 to 1.2 dL/g and comprises 100 mol percent dicarboxylic acid residue component, 100 mol percent diol residue component, catalyst residues and color control agent residues.

The dicarboxylic acid residue component comprises at least 75 mol percent of terephthalic acid residues. Up to about 25 mol percent of the dicarboxylic acid residue component may consist of residues of one or more aliphatic, alicyclic, or aromatic dicarboxylic acids other than terephthalic acid. Examples of such other dicarboxylic acids include isophthalic acid, 1,4-cylcohexanedicarboxylic acid, 1,3-cyclohexanedicarboxylic acid, succinic acid, glutaric acid, adipic acid, sebacic acid, 1,12-dodecanedioic acid, 2,6-naphthalenedicarboxylic acid and the like. In the polyester preparation, it is often preferable to use a functional acid derivative thereof such as the dimethyl, diethyl, or dipropyl ester of the dicarboxylic acid. The anhydrides or acid halides of these acids may also be employed where practical.

The diol residue component comprises 10 to 50 mol percent diethylene glycol residue and 50 to 90 mol percent ethylene glycol (EG) residue. Preferably the diethylene glycol residue ranges from 25 to 50 mol percent, more preferably 32 to 40 mol percent. Preferably the ethylene glycol residue ranges from 75 to 90 mol percent, more preferably 60 to 68 mol percent. The diol residue component may include up to 10 mol percent of conventional diols such as propylene glycol, 1,3-propanediol, 2,4-dimethyl-2-ethylhexane-1,3-diol, 2,2-dimethyl-1,3-propanediol, 2-ethyl-2-butyl-1,3-propanediol, 2-ethyl-2-isobutyl-1,3-propanediol, 1,3-butanediol, 1,4-butanediol, neopentyl glycol, 1,5-pentanediol, 1,6-hexanediol, 1,8-octanediol, 2,2,4-trimethyl-1,6-hexanediol, thiodiethanol, 1,2-cyclohexanedimethanol, 1,3-cyclohexanedimethanol, 2,2,4,4-tetramethyl-1,3-cyclobutanediol and the like.

The novel catalyst system of the present invention comprises catalyst residues of 20 to 100 ppm manganese, 50 to 300 ppm antimony, 0 to 100 ppm titanium and 40 to 150 ppm phosphorus, based on the weight of the copolyester. Preferably, the catalyst residues comprise 40 to 80 ppm manganese, 150 to 250 ppm antimony, 10 to 50 ppm titanium and 50 to 150 ppm phosphorus.

The manganese is preferably used as a salt. Examples of suitable manganese salts are manganous benzoate tetrahydrate, manganese oxide, manganese acetate, manganese acetylacetonate, manganese succinate, manganese glycolate, manganese naphthalate and manganese salicyl salicylate.

The antimony is preferably added in a soluble form, i.e. antimony glycolate. The antimony glycolate is made by reacting antimony oxide with ethylene glycol.

The titanium is preferably added as titanium tetraalkoxide, e.g., titanium tetraisopropoxide, titanium tetraethoxide or titanium tetrabutoxide.

The phosphorus is preferably added as a phosphate ester such as trialkyl phosphate and triphenyl phosphate or as phosphoric acid.

The color control agent residues comprise either organic or inorganic toners which are compounds that neutralize the yellowness of the DEG modified PET made with the novel catalyst system to less than 15, preferably less than 10. The DEG modified PET made with the novel catalyst system has a b* color value of about 19. Thus, the combination of the color control agent and the novel catalyst system results in the improved clarity DEG modified PET of the present invention.

Cobalt, the preferred inorganic toner, is present in an amount of 40 to 100 ppm cobalt, preferably 65 to 100 ppm, based on the weight of the copolyester. Cobalt is preferably added as a salt. Examples of suitable cobalt salts are cobaltous acetate tetrahydrate, cobaltous nitrate, cobaltous chloride, cobalt acetylacetonate, cobalt naphthanate and cobalt salicyl salicylate.

Preferably, the organic toners are either 1) blue compounds of substituted 1,4-bis(2,6-dialylanilino) anthraquinone(s) in combination with certain red compounds of anthraquinones as disclosed in U.S. Pat. No. 5,372,864 and herein incorporated by reference or 2) 1-cyano-3H-dibenz[f,ij] isoquinoline-2,7-diones as disclosed in U.S. Pat. No. 4,745,174 and herein incorporated by reference.

The organic toner of the '864 patent comprises at least one blue substituted 1,4-bis(2,6-dialylanilino) anthraquinone(s) of the formula (I):

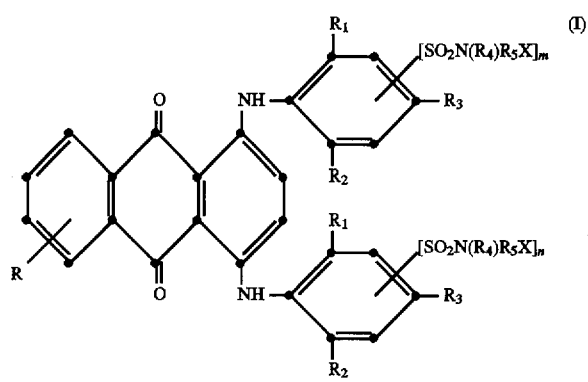

wherein:

R is selected from the group consisting of hydrogen, $C_1$–$C_6$ alkyl, halogen, carboxy, and

$R_1$ and $R_2$ are independently $C_1$–$C_6$-alkyl;

$R_3$ is selected from the group consisting of hydrogen, halogen, $C_1$–$C_6$-alkyl, substituted $C_1$–$C_6$ alkyl, hydroxy, $C_1$–$C_6$-alkoxy, substituted $C_1$–$C_6$-alkoxy, cyano, thiocyano, $C_1$–$C_6$-alkylthio, substituted $C_1$–$C_6$-alkylthio, $C_1$–$C_6$-alkylsulfonyl, substituted $C_1$–$C_6$-alkylsulfonyl, $C_1$–$C_6$-alkoxycarbonyl, carboxy, aryloxy, arylthio, arylsulfonyl, and $SO_2N(R_4)R_5X$ when m and/or n are zero;

$R_4$ is selected from the group consisting of hydrogen, $C_1$–$C_6$-alkyl, substituted $C_1$–$C_6$-alkyl, $C_3$–$C_8$-alkenyl, $C_3$–$C_8$-alkynyl, $C_3$–$C_7$-cycloalkyl and aryl;

$R_5$ is a linking group selected from the group consisting of $C_1$–$C_8$-alkylene, $C_1$–$C_6$-alkylene-Z-$C_1$–$C_6$-alkylene, arylene-$C_1$–$C_6$-alkylene, arylene-Z-$C_1$–$C_6$-alkylene, $C_3$–$C_7$-cycloalkylene, $C_1$–$C_6$-alkylene-cycloalkylene-$C_1$–$C_6$-alkylene, $C_1$–$C_6$-alkylene-arylene-$C_1$–$C_6$-alkylene, and $C_1$–$C_6$-alkylene-Z-arylene-Z-$C_1$–$C_6$-alkylene, wherein Z is selected from —O—, —S— or $SO_2$;

X is hydrogen or a polyester reactive group; and m and n are independently 0 or 1; with the proviso that at least one polyester reactive group is present.

The red compounds of the organic toners of the '864 patent, which may be blended with the blue compounds of formula I above, have the following structural formulae II–X:

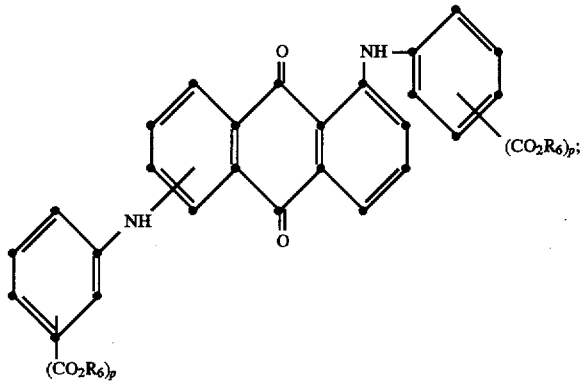

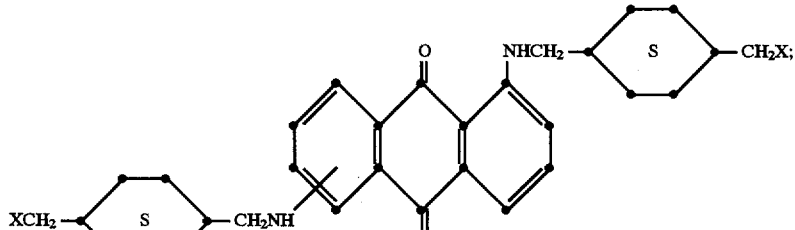

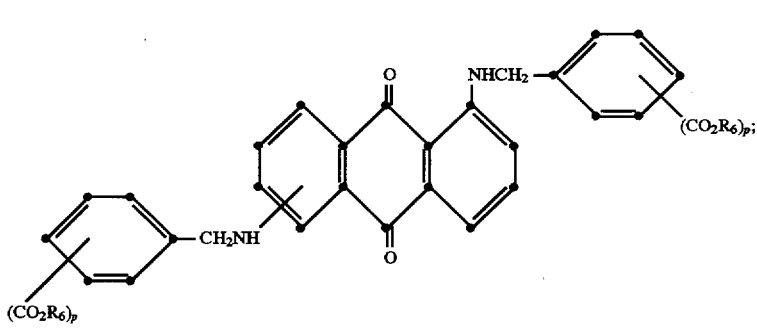

-continued

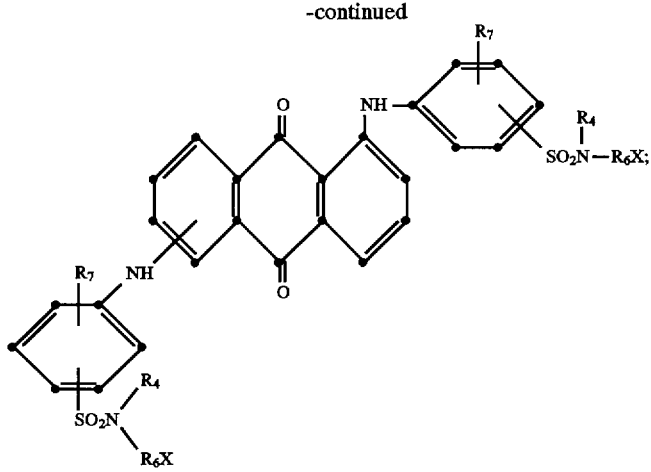

V

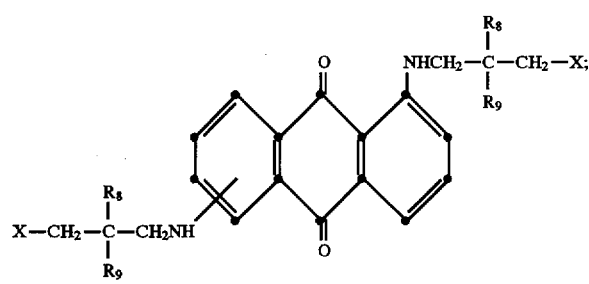

VI

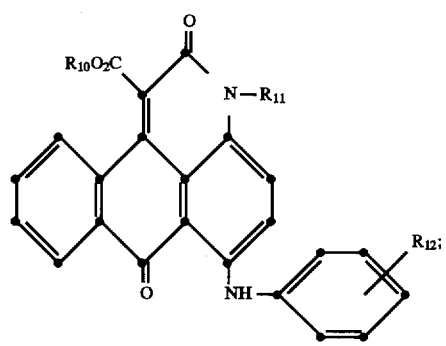

VII

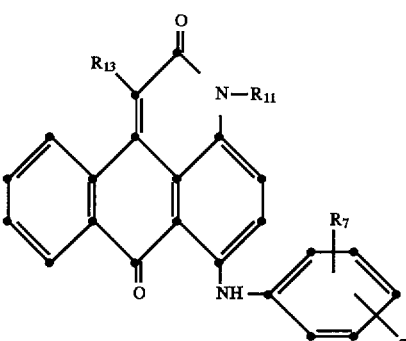

VIII

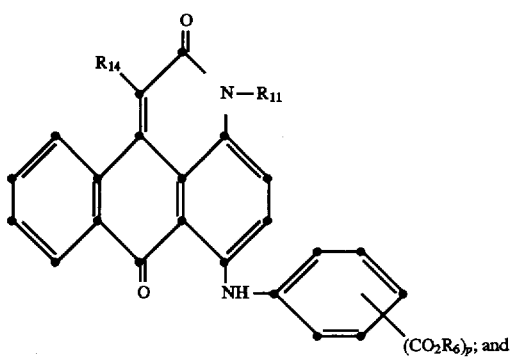

IX

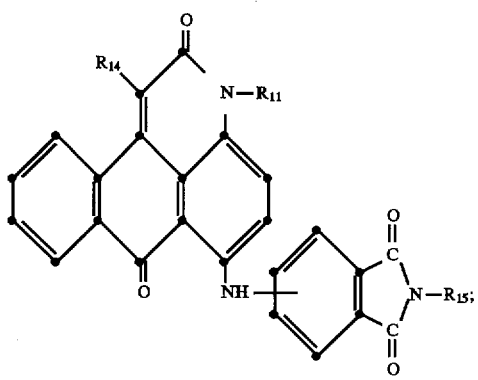

X wherein:

$R_6$ is selected from the group consisting of hydrogen, $C_1$–$C_6$-alkyl, substituted $C_1$–$C_6$-alkyl, $C_3$–$C_7$-cycloalkyl or aryl;

$R_7$ is hydrogen or one to three groups selected from $C_1$–$C_6$-alkyl, substituted $C_1$–$C_6$ alkyl, $C_1$–$C_6$-alkanoylamino, halogen, hydroxy, $C_1$–$C_6$-alkyl $C_1$–$C_6$-alkoxy, $C_1$–$C_6$-alkylthio;

$R_8$ and $R_9$ are the same or different and are selected from the group consisting of $C_1$–$C_6$-alkyl, substituted $C_1$–$C_6$-alkyl, $C_3$–$C_7$-cycloalkyl or aryl;

$R_{10}$ is selected from the group consisting of $C_1$–$C_6$-alkyl, $C_3$–$C_7$-cycloalkyl or aryl;

$R_{11}$ is selected from the group consisting of hydrogen, $C_1$–$C_{12}$-alkyl, substituted $C_1$–$C_{12}$-alkyl, $C_3$–$C_7$-cycloalkyl and aryl;

$R_{12}$ is hydrogen or one to three groups selected from the group consisting of $C_1-C_6$-alkyl, substituted $C_1-C_6$-alkyl, $C_1-C_6$-alkoxy, substituted $C_1-C_6$-alkoxy, $C_1-C_6$-alkylthio, substituted $C_1-C_6$-alkylthio, halogen, hydroxy, $C_1-C_6$-alkanoylamino, aroylamino, $C_1-C_6$-alkylsulfonylamino and arylsulfonylamino;

$R_{13}$ and $R_{14}$ are selected from hydrogen, cyano or $CO_2R_{10}$;

$R_{15}$ is $R_4$ or $R_5X$ as previously defined;

L is —CO— or —SO$_2$—; X is as previously defined; m is 0 or 1; p is 1 or 2; with the provisos that $R_{13}$ is hydrogen when m is 0 and at least one polyester reactive group is present.

The organic toners of the '864 patent are present in amounts of 1.5 to 10 ppm for the blue compounds and 0.5 to 6 ppm for the red compounds, based on the weight of the copolyester. The preferred amount of the blue compounds is 2.8 to 7 ppm. The preferred amount of the red compounds is 0.8 to 4 ppm.

The organic toners of the '174 patent are substituted 1-cyano-3H-dibenzo [f,ij] isoquinoline-2,7-diones having the following structural formula

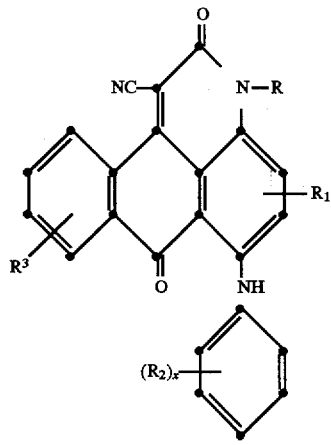

wherein

R is hydrogen, cycloalkyl, allyl, alkyl, aralkyl, alkoxyalkyl or cycloalkylalkylene;

$R_1$ is hydrogen, halogen, alkyl, alkoxy, aryloxy, alkylthio, or arylthio;

$R_2$ is hydrogen, halogen, alkyl, aryl, alkoxy, arylalkoxy, alkylthio, arylthio, carbalkoxy, carbaralkoxy, carboxy, sulfamoyl, alkylsulfamoyl, dialkylsulfamoyl, alkylarylsulfamoyl, cycloalkylsulfamoyl, arylsulfamoyl, carbamoyl, alkylcarbamoyl, dialkylcarbamoyl, alkylarylcarbamoyl, cycloalkylcarbamoyl, arylcarbamoyl, 2-pyrrolidono, acylamido or N-alkylacylamido;

$R_3$ is one or more residues selected from the group consisting of hydrogen, halogen, alkyl and alkoxy;

x is an integer of 1 to 5;

wherein one or more alkyl, alkoxy, aryl, aryloxy, alkylthio, arylthio or aralkyl groups may contain one or more reactive residues selected from the group consisting of carboxy, carbalkoxy, carbaryloxy, N-alkylcarbamoyloxy, carbamoyloxy, acyloxy, chlorocarbonyl, hydroxyl, cycloalkylcarbonyloxy, N-arylcarbamoyloxy and N,N-dialkylcarbamoyloxy, wherein said alkyl and aryl groups may further contain substituents such as alkoxy, acyloxy, halogen, cyano, hydroxy and acylamido.

The preferred 1-cyano-3H-dibenzo [f,ij] isoquinoline-2,7 diones of the instant invention are those illustrated by the formula

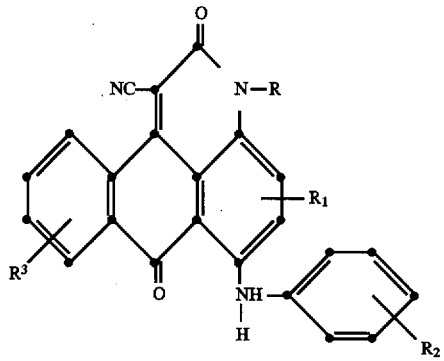

wherein R is methyl, $R_1$ is hydrogen, $R_3$ is hydrogen and $R_2$ is 4'-(2 hydroxyethyl).

Another preferred toner of the instant invention is that compound wherein R is methyl, $R_1$ is hydrogen, $R_3$ is hydrogen and $R_2$ is 4'-(2-hydroxyethoxy).

These organic toners of Formula XI and XII are present in amounts of 0.5 to 10 ppm, preferably 1 to 5 ppm, based on the weight of the polyester.

The polyesters of the present invention may be prepared according to conventional esterification/transesterification processes wherein the terephthalic acid, or the ester-forming derivative thereof such as dimethyl terephthalate, optionally in combination with another dicarboxylic acid or ester-forming derivative thereof, is reacted with a mixture of ethylene and diethylene glycols in the presence of the novel catalyst system and the color control agent. The reaction mixture is then subjected to polycondensation conditions of increasing temperature and decreasing pressure to obtain a polyester. Typically the first stage of the process (esterification/transesterification) is performed in the presence of the manganese, titanium and antimony compounds and the color control agent at ambient pressure to about 60 psig and at temperatures in the range of about 160° to 240° C. The second stage of the process (polycondensation) is carried out in the presence of the phosphorus compound at temperatures over the range of about 250° to 300° C., preferably not above about 280° C. since the use of higher temperatures affects detrimentally the thermal stability of the polyester. The second stage typically occurs under reduced pressure of less than 5 mm Hg, preferably less than 1 mm Hg.

The catalyst compounds may be added individually or in combination at the commencement of the process. The use of manganese and phosphorus compounds, however, are added at different stages with the manganese in the first stage and phosphorus in the second stage. The titanium and antimony compounds may be added in either stage. The color control agent may be added at any stage in the process, but is typically added between the first and second stage.

The DEG modified PET of the present invention may also be prepared by conventional continuous processes. For example, high molecular weight polyesters are produced by continuously adding free dicarboxylic acid or its ester derivative and glycol to molten low molecular weight polyester resin, reacting them while continuously withdrawing low molecular weight resin; introducing the resin withdrawn into a polymerization apparatus; continuously polymerizing it to high molecular weight resin and withdrawing high molecular weight polyester resin from the polymerization apparatus.

Data of copolyester samples prepared on small scale pilot operations illustrates the effectiveness of the novel catalyst system of the present invention over conventional catalyst systems, as shown in Table II, Examples A–E. Using the conventional catalyst system and no toners, the Control gives a copolyester having a b* value of 28. Material produced under the same conditions with the novel catalyst system and no toners, Example D, gives a b* value of 19 in the copolyester. The addition of toners to the novel catalyst system, Example E, lowers the b* value to 11.

color control agent are incorporated into conventional processing techniques and do not alter the existing properties of the copolyester, thus making for easy substitution into existing applications.

This invention has been described in detail with particular reference to preferred embodiments and methods thereof, but it will be understood that variations and modifications can be effected within the spirit and scope of the invention.

We claim:

TABLE II

| Examples | Ti | Mn | Sb | P | Blue/Red Toners | Co | Polycond. Temp. | Polycond. Time | GC, mol % DEG | I.V. | L* | a* | b* |
|---|---|---|---|---|---|---|---|---|---|---|---|---|---|
| CONTROL | 47 | 82 |  | 41 |  |  | 283° C. | 1' 50" |  | 0.743 | 75.89 | 0.29 | 28.44 |
| A | 41 | 81 |  | 35 | 3.3/1.3 |  | 285° C. | 2' 15" | 38.85 | 0.829 | 79.21 | −1.23 | 25.63 |
| B | 41 | 80 |  | 38 | 3.3/1.3 |  | 275° C. | 5' 20" | 37.88 | 0.822 | 76.33 | −1.50 | 25.48 |
| C | 21 | 54 | 231 | 138 |  | 78 | 275° C. | 9' 30" | 36.23 | 0.748 | 76.67 | −3.38 | 11.94 |
| D | 19 | 55 | 220 | 144 |  |  | 275° C. | 8' 15" | *33.35* | 0.779 | 78.58 | −2.61 | 19.35 |
| E | 20 | 56 | 216 | 145 | 3.3/1.3 |  | 275° C. | 10' | 36.86 | 0.757 | 77.45 | −3.25 | 10.89 |
| F | 28 | 48 | 231 | 76 | 6.8/4.1 |  |  |  |  | 0.747 | 56.50 | −1.6 | 8.90 |
| G | 28 | 47 | 231 | 77 | 7.1/4.0 |  |  |  |  | 0.743 | 54.8 | −4.0 | 4.90 |

For the Examples A–E in Table II, a DEG modified PET (100 mol % PET, 37 mol % DEG and 63 mol % EG) was prepared in the laboratory by placing 79 g DMT (Dimethylterephthalate), 45.9 g EG and 27.6 g DEG into a 500 ml flask. Catalysts were as follows; 20 ppm Ti, 55 ppm Mn, and 230 ppm Sb. Co was added or a blue and red toner combination to help improve clarity, i.e. reduce yellowness. The mixture was heated in a molten metal bath to 210° C. The molten mixture released methanol as a result of the ester exchange process. After 2 hours, 108 ppm P was added, temperature was raised to 275° C. and the pressure was lowered to <1 mm Hg. The polycondensation reaction was allowed to proceed for about 1 hour. The material was allowed to cool and removed from the flask.

For continuous process operations the b* color values are reduced to below 10. This data is set forth in Table II, Examples F and G. These examples were prepared in a continuous process utilizing conventional sloped tray technology. The production line was configured with two ester exchange reactors (R1 and R1A), one prepolymer reactor (R2) and a vertical sloped tray finish reactor (R3). R1 was a continuous stir tank reactor operated at 206° C. To R1 was added 100 mol percent dimethyl terephthalate, 37 mol percent diethylene glycol and 63 mol percent ethylene glycol. To complete ester exchange the resin produced from R1 was feed into a R1A, a multi-stage plug flow reactor. Temperature increased over a range of 232° to 242° C. The resulting low molecular weight resin was feed into a polymerization apparatus, R2, in which the resin was polymerized to an I.V. of approximately 0.2 dL/g. R2 was operated at 265° C. R3 was operated so that the temperature of tray 10, which is about the middle of the reactor, was 279° C. Increasing the temperature of R3 resulted in a strong increase in b* value, approximately 4 units.

The term "inherent viscosity" (I.V.) as used herein refers to viscosity determinations made at 25° C. using 0.25 gram of polymer per 100 mL of a solvent composed of 60 weight percent phenol and 40 weight percent tetrachloroethane.

The improved clarity copolyesters of present invention provide diethylene glycol modified poly(ethylene terephthalates) suitable for use in shrink film applications as well as other applications requiring clear to neutral color materials. The novel catalyst system and the addition of the color control agent are incorporated into conventional processing techniques and do not alter the existing properties of the copolyester, thus making for easy substitution into existing applications.

1. An improved clarity copolyester composition having a b* value of less than 15, having an inherent viscosity of about 0.4 to 1.2 dL/g and comprising:

A. 100 mol percent dicarboxylic acid residue component comprising at least 75 mol percent of terephthalic acid residues;

B. 100 mol percent diol residue component comprising 10 to 50 mol percent diethylene glycol residue and 50 to 90 mol percent ethylene glycol residue;

C. catalyst residues comprising 20 to 100 ppm manganese, 50 to 300 ppm antimony, 0 to 100 ppm titanium and 40 to 150 ppm phosphorus, based on the weight of the copolyester; and D. color control agent residues comprising organic or inorganic toners present in a sufficient amount whereby the b* color value of the combination of components A, B, and C is reduced to less than 15 by the addition of component D.

2. The improved clarity copolyester of claim 1 wherein the color control agent residues are selected from the group consisting of (i) 40 to 100 ppm cobalt;

(ii) 1.5 to 10 ppm of a blue compound having the formula (I):

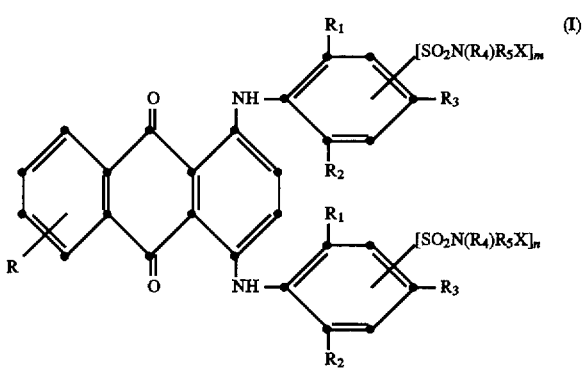

wherein:

R is selected from the group consisting of hydrogen, $C_1$–$C_6$ alkyl, halogen, carboxy, and

$R_1$ and $R_2$ are independently $C_1$–$C_6$-alkyl;

$R_3$ is selected from the group consisting of hydrogen, halogen, $C_1$–$C_6$-alkyl, substituted $C_1$–$C_6$ alkyl, hydroxy, $C_1$–$C_6$-alkoxy, substituted $C_1$–$C_6$-alkoxy, cyano, thiocyano, $C_1$–$C_6$-alkylthio, substituted $C_1$–$C_6$-alkylthio, $C_1$–$C_6$-alkylsulfonyl, substituted $C_1$–$C_6$-alkylsulfonyl, $C_1$–$C_6$-alkoxycarbonyl, carboxy, aryloxy, arylthio, arylsulfonyl, and $SO_2N(R_4)R_5X$ when m and/or n are zero;

$R_4$ is selected from the group consisting of hydrogen, $C_1$–$C_6$-alkyl, substituted $C_1$–$C_6$-alkyl, $C_3$–$C_8$-alkenyl, $C_3$–$C_8$-alkynyl, $C_3$–$C_7$-cycloalkyl and aryl;

$R_5$ is a linking group selected from the group consisting of $C_1$–$C_8$-alkylene, $C_1$–$C_6$-alkylene-Z-$C_1$–$C_6$-alkylene, arylene-$C_1$–$C_6$-alkylene, arylene-Z-$C_1$–$C_6$-alkylene, $C_3$–$C_7$-cycloalkylene, $C_1$–$C_6$-alkylene-cycloalkylene-$C_1$–$C_6$-alkylene, $C_1$–$C_6$-alkylene-arylene-$C_1$–$C_6$-alkylene, and $C_1$–$C_6$-alkylene-Z-arylene-Z-$C_1$–$C_6$-alkylene, wherein Z is selected from —O—, —S— or $SO_2$; X is hydrogen or a polyester reactive group; and m and n are independently 0 or 1; with the proviso that at least one polyester reactive group is present and 0.5 to 6 ppm of a red compound having the structural formulae II–X:

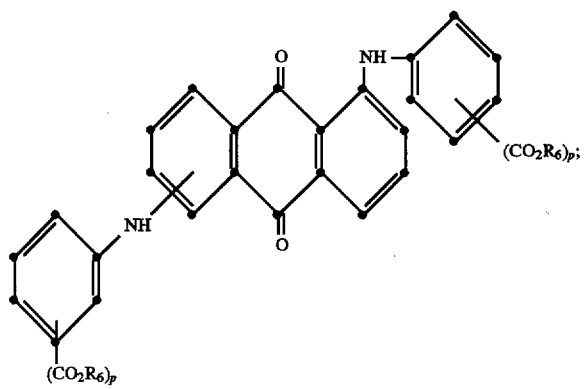

II

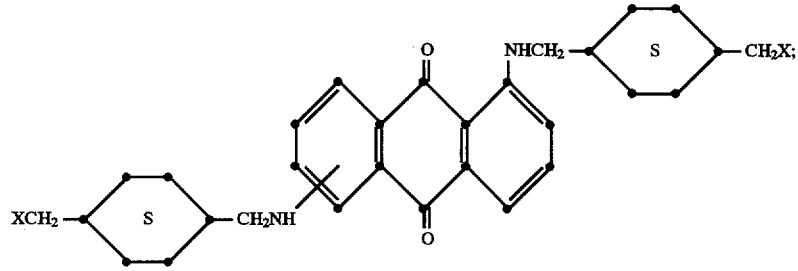

III

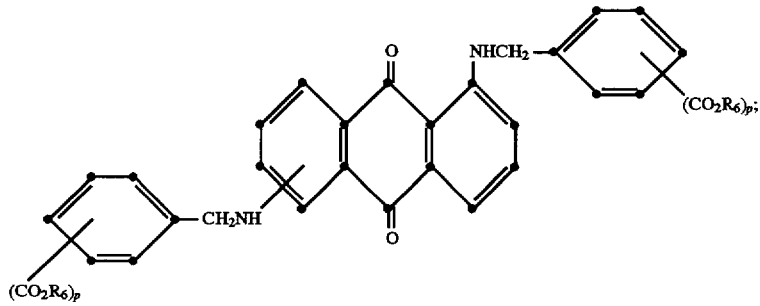

IV

-continued

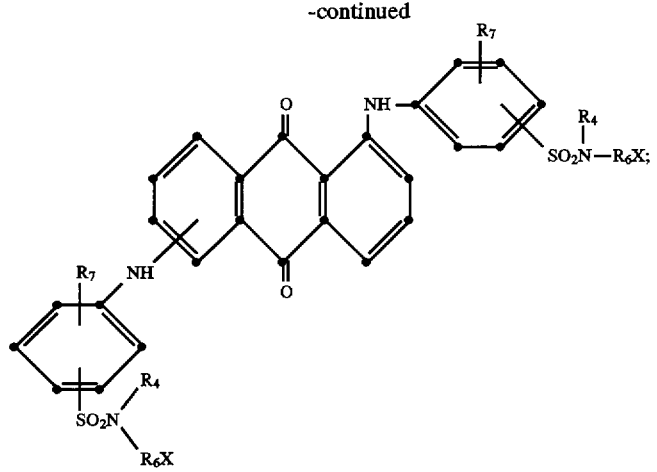

V

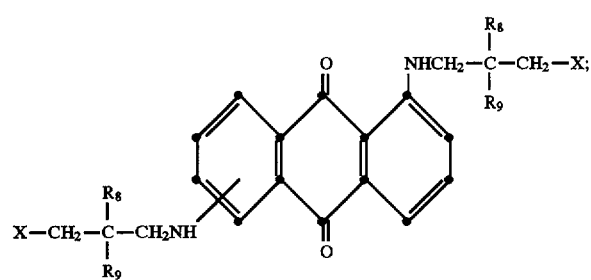

VI

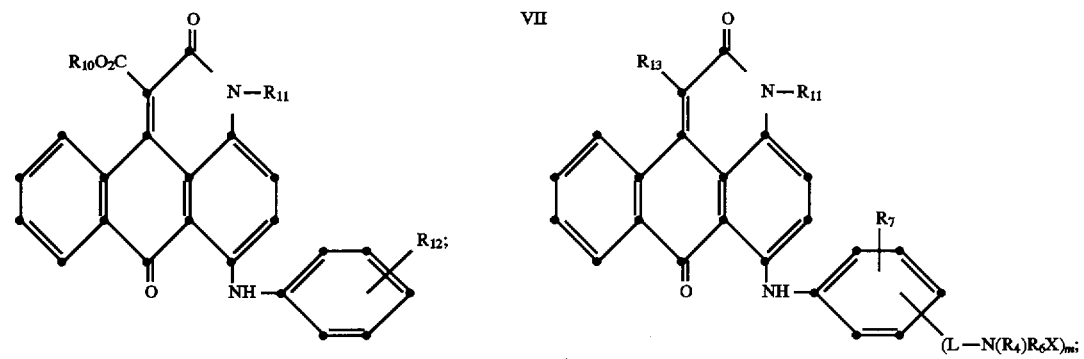

VII    VIII

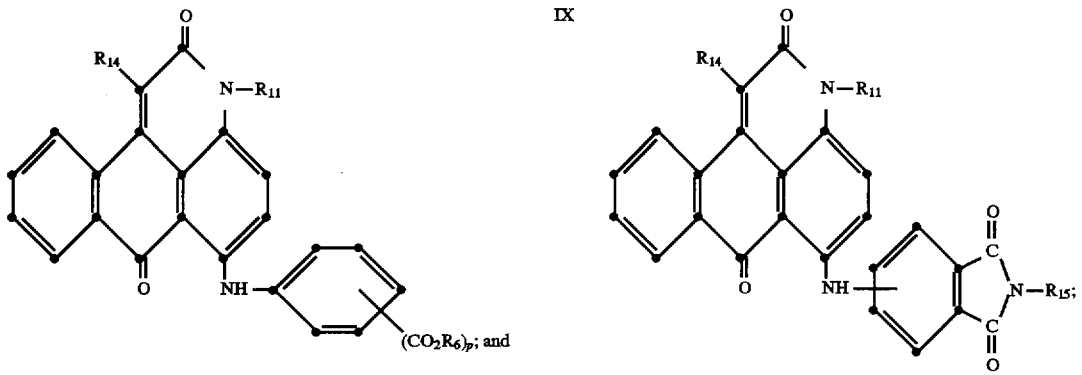

IX    X wherein:
 $R_6$ is selected from the group consisting of hydrogen, $C_1$–$C_6$-alkyl, substituted $C_1$–$C_6$-alkyl, $C_3$–$C_7$-cycloalkyl or aryl;
 $R_7$ is hydrogen or one to three groups selected from $C_1$–$C_6$-alkyl, substituted $C_1$–$C_6$ alkyl, $C_1$–$C_6$-alkanoylamino, halogen, hydroxy, $C_1$–$C_6$-alkyl $C_1$–$C_6$-alkoxy, $C_1$–$C_6$-alkylthio;

$R_8$ and $R_9$ are the same or different and are selected from the group consisting of $C_1$–$C_6$-alkyl, substituted $C_1$–$C_6$-alkyl, $C_3$–$C_7$-cycloalkyl or aryl;
 $R_{10}$ is selected from the group consisting of $C_1$–$C_6$-alkyl, $C_3$–$C_7$-cycloalkyl or aryl;

$R_{11}$ is selected from the group consisting of hydrogen, $C_1$–$C_{12}$-alkyl, substituted $C_1$–$C_{12}$-alkyl, $C_3$–$C_7$-cycloalkyl and aryl;

$R_{12}$ is hydrogen or one to three groups selected from the group consisting of $C_1$–$C_6$-alkyl, substituted $C_1$–$C_6$-alkyl, $C_1$–$C_6$-alkoxy, substituted $C_1$–$C_6$-alkoxy, $C_1$–$C_6$-alkylthio, substituted $C_1$–$C_6$-alkylthio, halogen, hydroxy, $C_1$–$C_6$-alkanoylamino, aroylamino, $C_1$–$C_6$-alkylsulfonylamino and arylsulfonylamino;

$R_{13}$ and $R_{14}$ are selected from hydrogen, cyano or $CO_2R_{10}$;

$R_{15}$ is $R_4$ or $R_5X$ as previously defined;

L is —CO— or —$SO_2$—; X is hydrogen or a polyester reactive group; m is 0 or 1; p is 1 or 2;

with the provisos that $R_{13}$ is hydrogen when m is 0 and at least one polyester reactive group is present; and (iii) 0.5 to 10 ppm of a compound having the formula (XI):

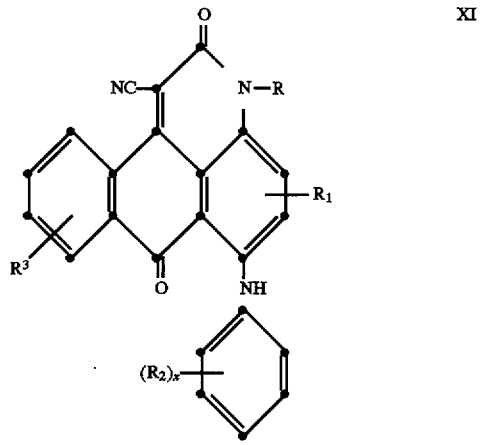

wherein

R is hydrogen, cycloalkyl, allyl, alkyl, aralkyl, alkoxyalkyl or cycloalkylalkylene;

$R_1$ is hydrogen, halogen, alkyl, alkoxy, aryloxy, alkylthio, or arylthio;

$R_2$ is hydrogen, halogen, alkyl, aryl, alkoxy, arylalkoxy, alkylthio, arylthio, carbalkoxy, carbaralkoxy, carboxy, sulfamoyl, alkylsulfamoyl, dialkylsulfamoyl, alkylarylsulfamoyl, cycloalkylsulfamoyl, arylsulfamoyl, carbamoyl, alkylcarbamoyl, dialkylcarbamoyl, alkylarylcarbamoyl, cycloalkylcarbamoyl, arylcarbamoyl, 2-pyrrolidono, acylamido or N-alkylacylamido;

$R_3$ is one or more residues selected from the group consisting of hydrogen, halogen, alkyl and alkoxy;

x is an integer of 1 to 5;

wherein one or more alkyl, alkoxy, aryl, aryloxy, alkylthio, arylthio or aralkyl groups may contain one or more reactive residues selected from the group consisting of carboxy, carbalkoxy, carbaryloxy, N-alkylcarbamoyloxy, carbamoyloxy, acyloxy, chlorocarbonyl, hydroxyl, cycloalkylcarbonyloxy, N-arylcarbamoyloxy and N,N-dialkylcarbamoyloxy, wherein said alkyl and aryl groups may further contain substituents such as alkoxy, acyloxy, halogen, cyano, hydroxy and acylamido;

with all weights in ppm based on the weight of the copolyester.

3. The copolyester composition of claim 1 having a b* value of less than 10.

4. The copolyester composition of claim 1 wherein the diol residue component comprises 25 to 50 mol percent diethylene glycol residue and 75 to 90 mol percent ethylene glycol residue.

5. The copolyester composition of claim 4 wherein the diethylene glycol residue is present in an amount of 32 to 40 mol percent and the ethylene glycol residue is present in an amount of 60 to 68 mol percent.

6. The copolyester composition of claim 1 wherein the catalyst residues comprise 40 to 80 ppm manganese, 150 to 250 ppm antimony, 10 to 50 ppm titanium and 50 to 150 ppm phosphorus.

7. The copolyester composition of claim 2 wherein the cobalt is present in an amount of 65 to 100 ppm.

8. The copolyester composition of claim 2 wherein the blue compound is present in an amount of 2.8 to 7 ppm and the red compound is present in an amount of 0.8 to 4 ppm.

9. A process for producing an improved clarity copolyester composition having a b* value of less than 15, an inherent viscosity of about 0.4 to 1.0 dL/g, and having repeat units from a dicarboxylic acid residue component comprising repeat units from at least 75 mol percent of terephthalic acid residues and a diol residue component comprising repeat units from 10 to 50 mol percent diethylene glycol residue and 50 to 90 mol percent ethylene glycol residue, which comprises reacting the dicarboxylic acid and the diol residue components at temperatures sufficient to effect esterification or trans-esterification and polycondensing the reaction product in the presence of catalyst residues of 20 to 100 ppm manganese, 50 to 300 ppm antimony, 0 to 100 ppm titanium and 40 to 150 ppm phosphorus and color control agent residues selected from the group consisting of (i) 40 to 100 ppm cobalt;

(ii) 1.5 to 10 ppm of a blue compound having the formula (I):

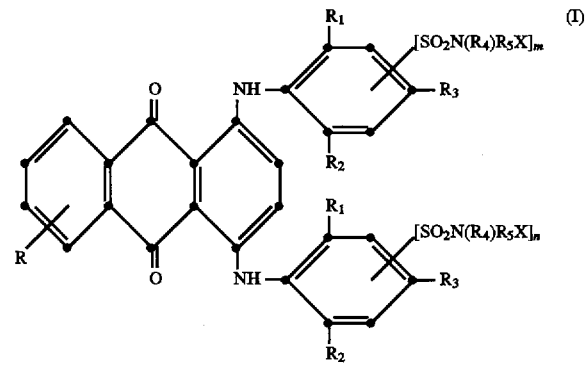

wherein:

R is selected from the group consisting of hydrogen, $C_1$–$C_6$ alkyl, halogen, carboxy, and

$R_1$ and $R_2$ are independently $C_1$–$C_6$-alkyl;

$R_3$ is selected from the group consisting of hydrogen, halogen, $C_1$–$C_6$-alkyl, substituted $C_1$–$C_6$ alkyl, hydroxy, $C_1$–$C_6$-alkoxy, substituted $C_1$–$C_6$-alkoxy, cyano, thiocyano, $C_1$–$C_6$-alkylthio, substituted $C_1$–$C_6$-alkylthio, $C_1$–$C_6$-alkylsulfonyl, substituted $C_1$–$C_6$-alkylsulfonyl, $C_1$–$C_6$-alkoxycarbonyl, carboxy, aryloxy, arylthio, arylsulfonyl, and SO₂N(R₄)R₅X when m and/or n are zero;

R₄ is selected from the group consisting of hydrogen, $C_1$–$C_6$-alkyl, substituted $C_1$–$C_6$-alkyl, $C_3$–$C_8$-alkenyl, $C_3$–$C_8$-alkynyl, $C_3$–$C_7$-cycloalkyl and aryl;

R₅ is a linking group selected from the group consisting of $C_1$–$C_8$-alkylene, $C_1$–$C_6$-alkylene-Z-$C_1$–$C_6$-alkylene, arylene-$C_1$–$C_6$-alkylene, arylene-Z-$C_1$–$C_6$-alkylene, $C_3$–$C_7$-cycloalkylene, $C_1$–$C_6$-alkylene-cycloalkylene-$C_1$–$C_6$-alkylene, $C_1$–$C_6$-alkylene-arylene-$C_1$–$C_6$-alkylene, and $C_1$–$C_6$-alkylene-Z-arylene-Z-$C_1$–$C_6$-alkylene, wherein Z is selected from —O—, —S— or SO₂; X is hydrogen or a polyester reactive group; and m and n are independently 0 or 1; with the proviso that at least one polyester reactive group is present and 0.5 to 6 ppm of a red compound having the structural formulae II–X:

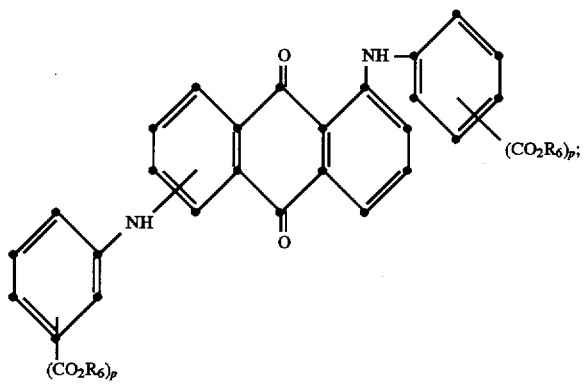

II

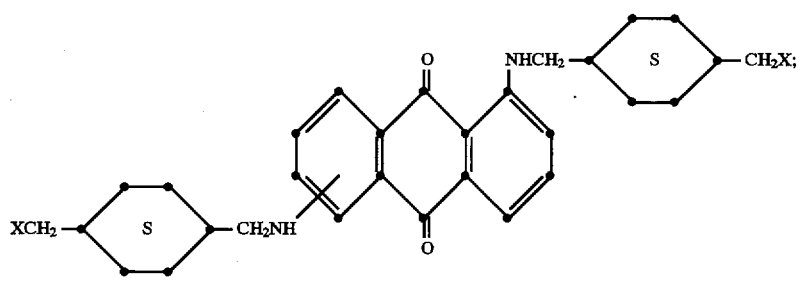

III

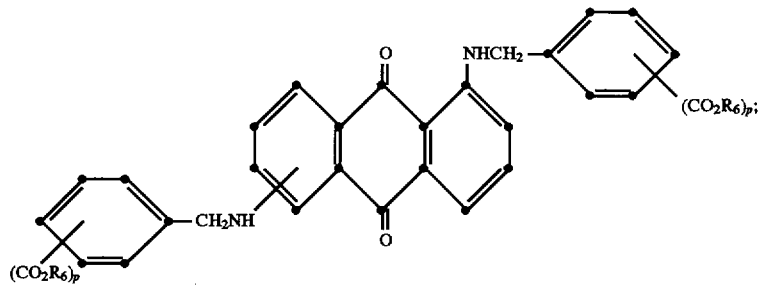

IV

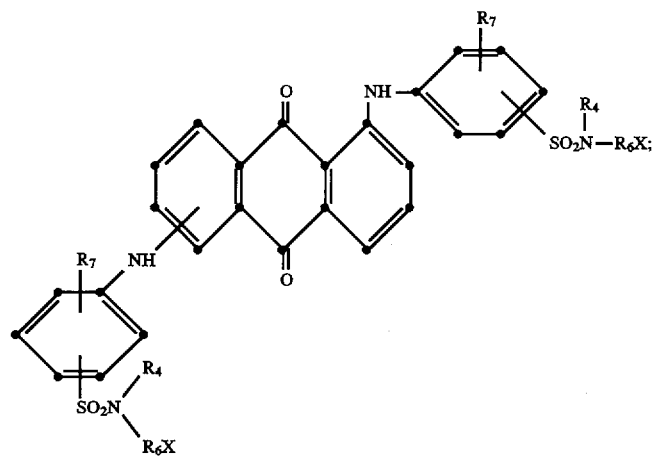

V

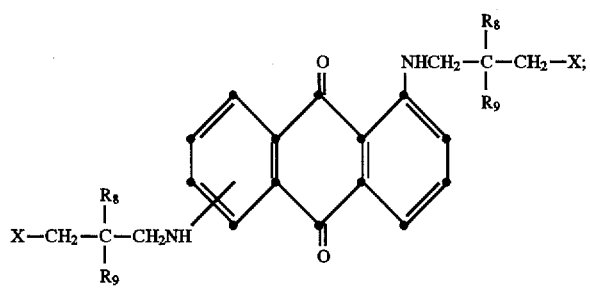
VI
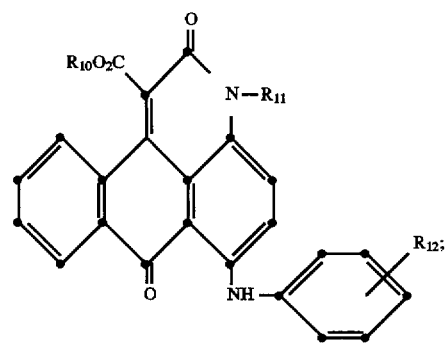
VII
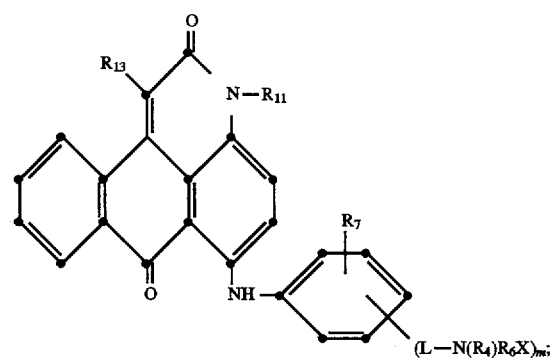
VIII
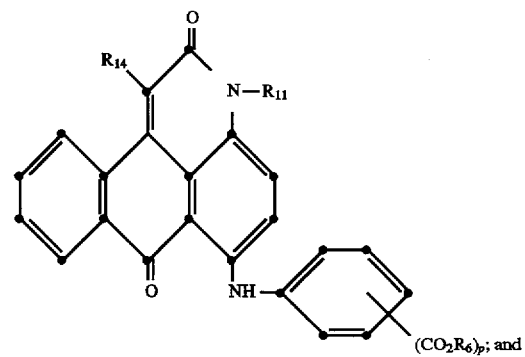
IX

-continued

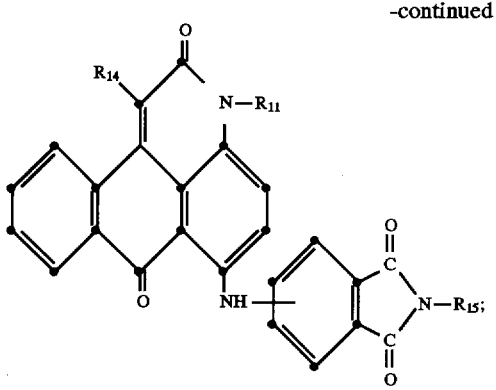

wherein:

- $R_6$ is selected from the group consisting of hydrogen, $C_1$–$C_6$-alkyl, substituted $C_1$–$C_6$-alkyl, $C_3$–$C_7$-cycloalkyl or aryl;
- $R_7$ is hydrogen or one to three groups selected from $C_1$–$C_6$-alkyl, substituted $C_1$–$C_6$ alkyl, $C_1$–$C_6$-alkanoylamino, halogen, hydroxy, $C_1$–$C_6$-alkyl $C_1$–$C_6$-alkoxy, $C_1$–$C_6$-alkylthio;
- $R_8$ and $R_9$ are the same or different and are selected from the group consisting of $C_1$–$C_6$-alkyl, substituted $C_1$–$C_6$-alkyl, $C_3$–$C_7$-cycloalkyl or aryl;
- $R_{10}$ is selected from the group consisting of $C_1$–$C_6$-alkyl, $C_3$–$C_7$-cycloalkyl or aryl;
- $R_{11}$ is selected from the group consisting of hydrogen, $C_1$–$C_{12}$-alkyl, substituted $C_1$–$C_{12}$-alkyl, $C_3$–$C_7$-cycloalkyl and aryl;
- $R_{12}$ is hydrogen or one to three groups selected from the group consisting of $C_1$–$C_6$-alkyl, substituted $C_1$–$C_6$-alkyl, $C_1$–$C_6$-alkoxy, substituted $C_1$–$C_6$-alkoxy, $C_1$–$C_6$-alkylthio, substituted $C_1$–$C_6$-alkylthio, halogen, hydroxy, $C_1$–$C_6$-alkanoylamino, aroylamino, $C_1$–$C_6$-alkylsulfonylamino and arylsulfonylamino;
- $R_{13}$ and $R_{14}$ are selected from hydrogen, cyano or $CO_2R_{10}$;
- $R_{15}$ is $R_4$ or $R_5X$ as previously defined;
- L is —CO— or —SO$_2$—; X is hydrogen or a polyester reactive group; m is 0 or 1; p is 1 or 2;

with the provisos that $R_{13}$ is hydrogen when m is 0 and at least one polyester reactive group is present; and (iii) 0.5 to 10 ppm of a compound having the formula (XI):

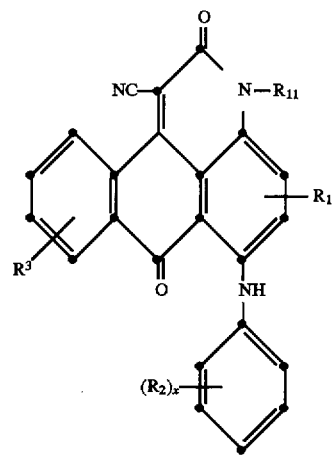

wherein
- R is hydrogen, cycloalkyl, allyl, alkyl, aralkyl, alkoxyalkyl or cycloalkylalkylene;
- $R_1$ is hydrogen, halogen, alkyl, alkoxy, aryloxy, alkylthio, or arylthio;
- $R_2$ is hydrogen, halogen, alkyl, aryl, alkoxy, arylalkoxy, alkylthio, arylthio, carbalkoxy, carbaralkoxy, carboxy, sulfamoyl, alkylsulfamoyl, dialkylsulfamoyl, alkylarylsulfamoyl, cycloalkylsulfamoyl, arylsulfamoyl, carbamoyl, alkylcarbamoyl, dialkylcarbamoyl, alkylarylcarbamoyl, cycloalkylcarbamoyl, arylcarbamoyl, 2-pyrrolidono, acylamido or N-alkylacylamido;
- $R_3$ is one or more residues selected from the group consisting of hydrogen, halogen, alkyl and alkoxy;
- x is an integer of 1 to 5;
- wherein one or more alkyl, alkoxy, aryl, aryloxy, alkylthio, arylthio or aralkyl groups may contain one or more reactive residues selected from the group consisting of carboxy, carbalkoxy, carbaryloxy, N-alkylcarbamoyloxy, carbamoyloxy, acyloxy, chlorocarbonyl, hydroxyl, cycloalkylcarbonyloxy, N-arylcarbamoyloxy and N,N-dialkylcarbamoyloxy, wherein said alkyl and aryl groups may further contain substituents such as alkoxy, acyloxy, halogen, cyano, hydroxy and acylamido, with all ppm weights based on the weight of the polyester.

10. An improved clarity copolyester produced according to the process of claim 9.

* * * * *

UNITED STATES PATENT AND TRADEMARK OFFICE
CERTIFICATE OF CORRECTION

PATENT NO. : 5,688,899
DATED : November 18, 1997
INVENTOR(S) : Marc Alan Strand et al.

It is certified that error appears in the above-identified patent and that said Letters Patent is hereby corrected as shown below:

On title page, item [54] and col. 1, line 2, "CLARITY COPOLYESTER" should be --- CLEAR COPOLYESTER ---.

Column 17, formula XI (Claim 2), that portion of the formula reading:

"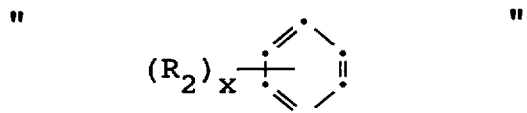"

should read

--- 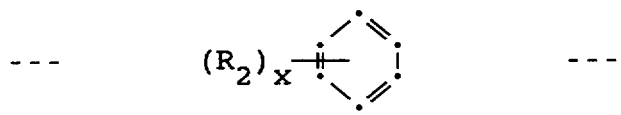 ---

Column 24, line 21, formula XI (Claim 9), that portion of the formula reading:

" 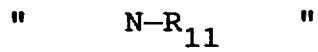 "

should read --- N-R ---.

Signed and Sealed this

Twenty-fourth Day of February, 1998

Attest:

BRUCE LEHMAN

*Attesting Officer*    *Commissioner of Patents and Trademarks*